United States Patent [19]

Holland

[11] Patent Number: 5,404,801
[45] Date of Patent: Apr. 11, 1995

[54] BARBEQUE GRILL WITH SMOKE FILTER

[76] Inventor: Robert B. Holland, 247 Summerwinds Dr., Cary, N.C. 27511

[21] Appl. No.: 94,870

[22] Filed: Jul. 20, 1993

[51] Int. Cl.6 .............................................. A23B 4/044
[52] U.S. Cl. ........................................ 99/482; 99/450; 126/25 R
[58] Field of Search ............... 99/450, 482; 126/25 R, 126/41 R

[56] References Cited

U.S. PATENT DOCUMENTS

| | | | |
|---|---|---|---|
| 163,359 | 5/1875 | Chambers, Jr. et al. | |
| 366,960 | 7/1887 | Brandon. | |
| 638,946 | 12/1899 | Updegraff et al. | |
| 739,214 | 9/1903 | Phillips. | |
| 1,259,417 | 3/1918 | Lamb. | |
| 1,651,442 | 12/1927 | Caskin. | |
| 2,851,941 | 9/1958 | Cogar | 99/259 |
| 3,217,634 | 11/1965 | Fox | 99/339 |
| 3,327,617 | 6/1967 | Harlett | 99/340 |
| 3,568,590 | 3/1971 | Grice | 99/446 |
| 3,593,647 | 7/1971 | Copeland | 99/259 |
| 3,623,423 | 9/1970 | Berger | 99/446 |
| 3,688,758 | 9/1972 | Stephen | 126/41 R |
| 3,880,139 | 4/1975 | Young | 126/25 R |
| 3,933,145 | 1/1976 | Rerch | 126/25 R |
| 4,043,312 | 8/1977 | Kern | 126/41 R |
| 4,071,738 | 1/1978 | Jenn et al. | 219/400 |
| 4,307,659 | 12/1981 | Martin et al. | 99/444 |
| 4,321,857 | 3/1982 | Best | 99/340 |
| 4,342,259 | 8/1982 | Lee | 99/425 |
| 4,454,805 | 6/1984 | Matthews | 99/400 |
| 4,846,146 | 7/1989 | Tucker | 126/41 R |
| 4,944,283 | 7/1990 | Tsuchiya | 126/41 R |

*Primary Examiner*—David A. Scherbel
*Assistant Examiner*—Terrence R. Till
*Attorney, Agent, or Firm*—Richard E. Jenkins

[57] ABSTRACT

A barbecue grill including a lower housing, heating means and food support means positioned within the lower housing, an upper housing or hood adapted to enclose the lower housing, a smoke exhaust means provided in said upper and/or lower housing for allowing smoke to escape from within the barbecue grill, and a filter positioned within the smoke exhaust means for removing contaminants from smoke passing therethrough into the atmosphere.

17 Claims, 5 Drawing Sheets

BARBEQUE GRILL WITH SMOKE FILTER

TECHNICAL FIELD

The present invention relates generally to barbeque grills for cooking meats and other foods. More particularly, the present invention relates to an improved barbeque grill which is provided with a filter in the exhaust means thereof in order to reduce contaminates contained in the cooking smoke which would normally enter the atmosphere.

RELATED ART

Outdoor barbeque grills have become very popular for outdoor cooking and are particularly enjoyed by friends and families at personal and social events. As is well known to one skilled in the art, barbeque grills utilize different types of heating means for cooking meats and other foods. A conventional and well-known type of barbeque grill utilizes combustible charcoal briquettes (or wood chips and/or wood pellets) which must be replenished with each use of the grill for cooking. More recently, barbeque grills utilizing propane gas and electric heating elements have become very popular and displaced many conventional grills which use combustible charcoal briquettes.

The propane gas and electric barbeque grills act to heat permanent cement briquettes or lava rock so that greases from the food being cooked will fall thereon and be vaporized in order to create a smoke environment for the food being cooked and impart additional smokey aroma and flavor thereto similar to the flavor imparted to food being cooked with conventional combustible briquettes on a barbeque grill.

Thus, the propane gas and electrically heated barbeque grills provide a measure of convenience which is not obtainable with conventional combustible briquette heated barbeque grills. Yet, the more convenient and popular propane gas and electrically heated barbeque grills provide substantially the same measure of tasty, smokey flavor which outdoor cooks obtain from old-fashioned, conventional barbeque grills.

Regardless of the type of barbeque grill utilized for outdoor cooking, it is well known that grease droppings from meat being cooked onto the combustible charcoal briquettes, wood chips, wood pellets, permanent cement charcoal briquettes, lava rock, or steel drip pans is vaporized and creates a smoke containing undesirable contaminants such as grease particles that are then exhausted directly into the atmosphere if the hood of the barbeque grill is removed or, if the hood of the barbeque grill is in place so as to enclose the grill, the contaminant-containing smoke is typically exhausted through a smoke exhaust system found in the hood or upper housing of the grill.

Although not originally of great concern, the contaminant-containing barbeque grill smoke has more recently become a concern since it is believed to contain grease particles and other undesirable contaminants that are freely exhausted into the atmosphere surrounding the barbeque grill. In fact, barbeque grills have been restricted in use at some social and/or public events. Therefore, very importantly, applicant has discovered an unexpected and surprising solution to the problem of how to render substantially less harmless the exhaustion of contaminant-containing smoke from barbeque grills into the atmosphere.

DISCLOSURE OF THE INVENTION

In accordance with the present invention, an improved barbeque grill is provided which solves the problems associated with prior art grill designs and provides a barbeque grill which acts to remove contaminants from the smoke being exhausted therefrom.

The improved barbeque grill of the present invention comprises a lower housing, heating means for providing cooking heat located within the lower housing, food supporting means positioned within the lower housing and above the heating means, and an upper housing or hood adapted to enclose the lower housing. The upper housing and/or lower housing includes a smoke exhaust therein which includes a filter so that undesirable smoke contaminants will be removed from smoke passing through the smoke exhaust.

Accordingly, it is an object of the present invention to provide a barbeque grill, either stationary or portable, which will act to remove undesirable contaminants from cooking smoke being exhausted during the cooking process.

Another object of the present invention is to provide a barbeque grill which will reduce flaming and the resultant fire hazard during the grilling process.

Another object of the present invention is to provide a barbeque grill which is highly efficient in its consumption of fuel.

Still another object of the present invention is to provide a barbeque grill with a smoke filter which serves to simply and inexpensively minimize air pollution created by cooking smoke emanating during outdoor cooking on the grill.

Some of the objects of the invention having been stated, other objects will become evident as the description proceeds, when taken in connection with the accompanying drawings described in detail below.

BEST MODE FOR CARRYING OUT THE INVENTION

Figure 1:
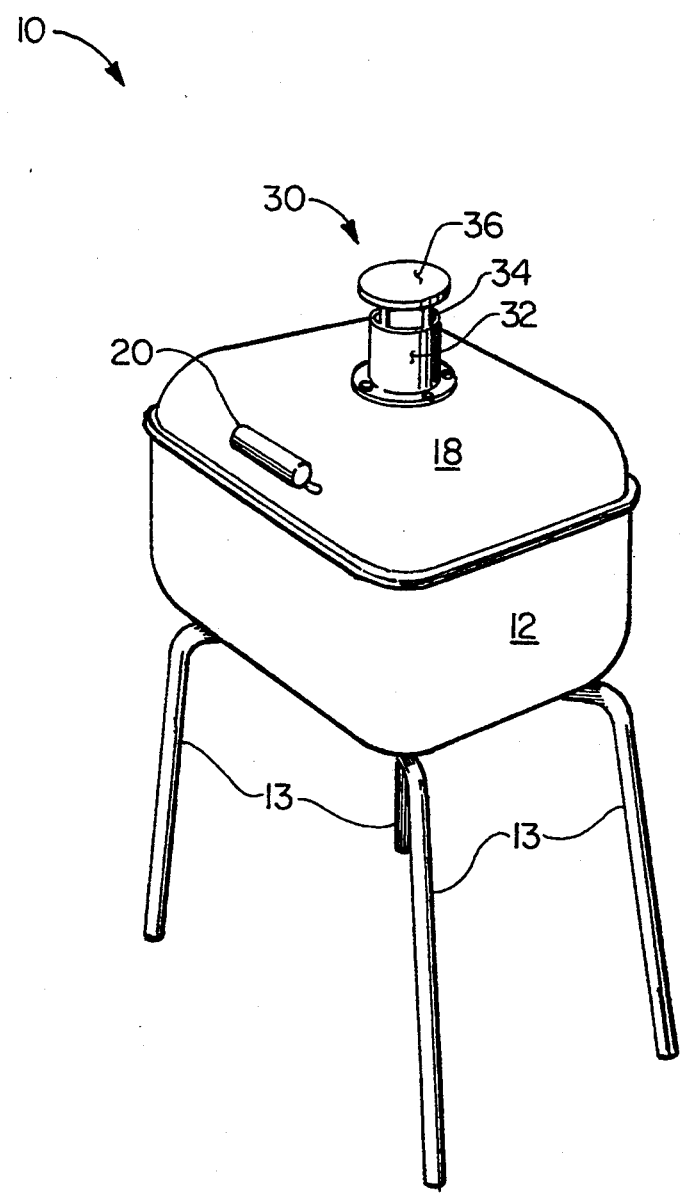
FIG. 1 is a perspective view of the barbeque grill with smoke filter of the present invention.

Referring now more specifically to the drawings, a preferred embodiment of the invention is shown in FIGS. 1 through 6. More specifically, the barbeque grill with smoke filter is designated generally by the numeral 10. Although a portable barbeque grill 10 is shown in the drawings, a stationary outdoor barbeque grill is contemplated as also being within the scope of the present invention.

Portable barbeque grill 10 comprises a lower housing 12 mounted on legs 13 and in which is positioned a first metallic grid 14 for supporting conventional charcoal briquettes B and a second metallic grid 16 for supporting meat and other foods during cooking on barbeque grill 10. Although other materials could be utilized, most suitably lower housing 12 is constructed of aluminum and first metallic grid 14 and second metallic grid 16 are constructed of stainless steel.

Figure 2:
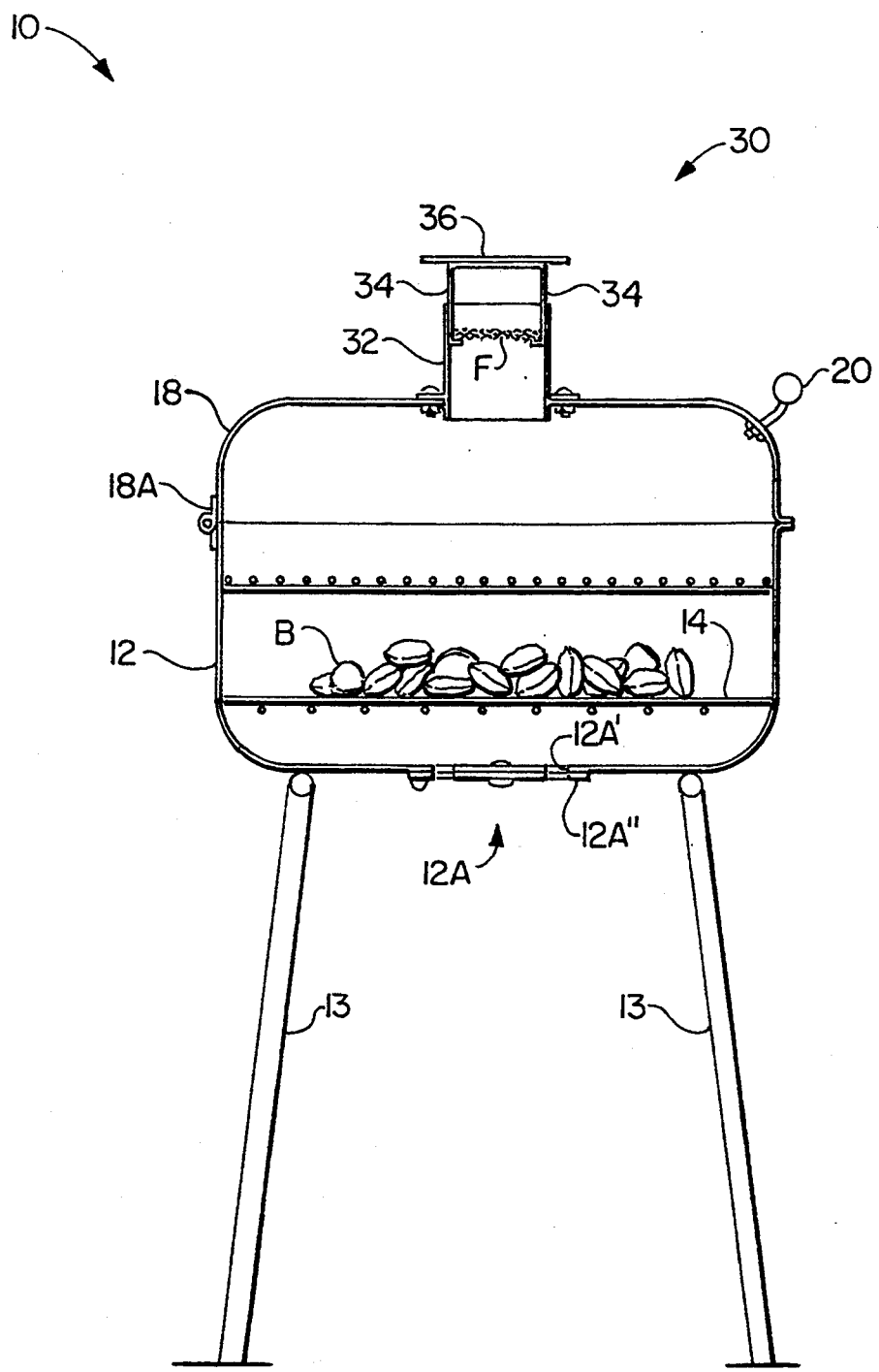
FIG. 2 is a vertical cross-section view of the barbeque grill with smoke filter of the present invention.
Figure 3:
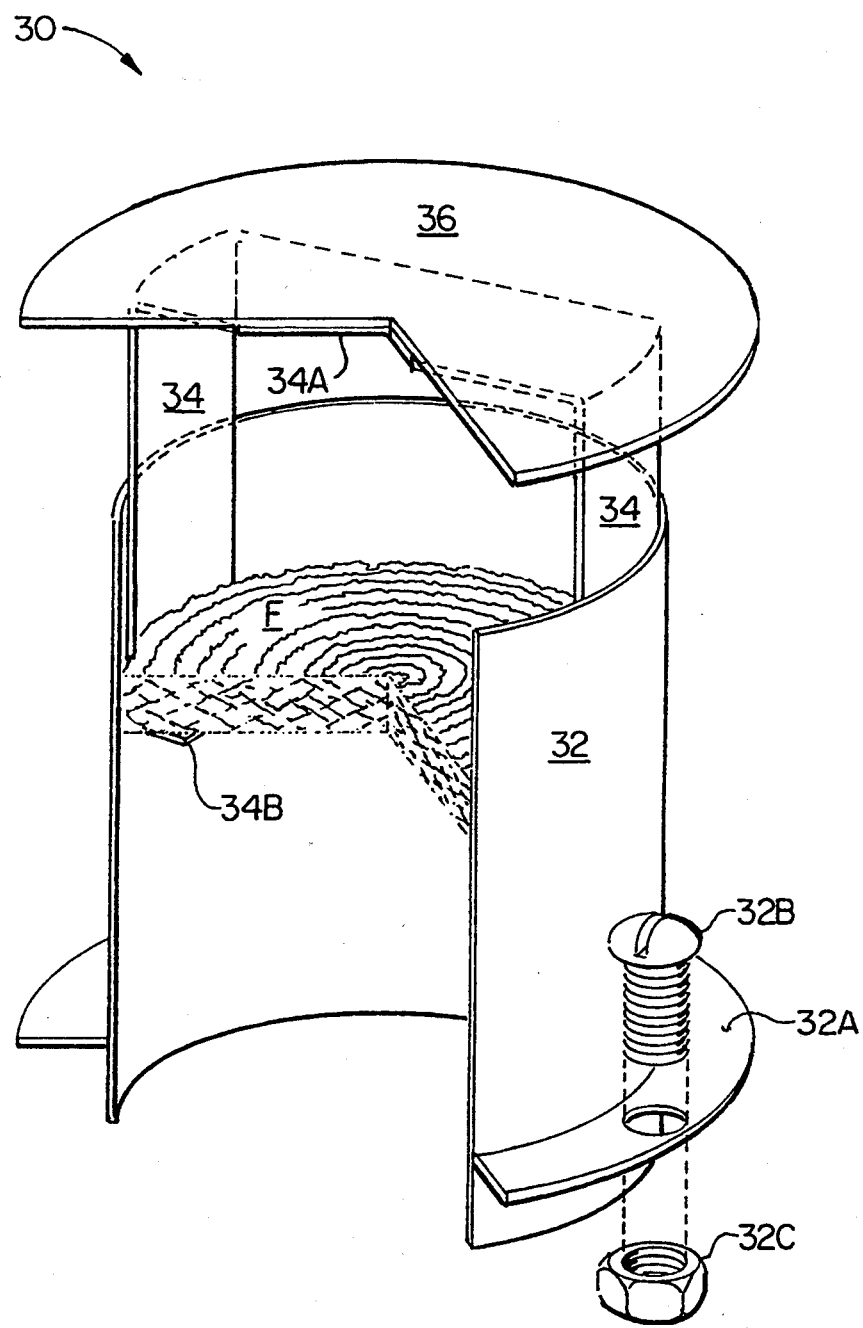
FIG. 3 is a perspective view, with parts broken away for clarity, of the smoke filter utilized on the grill shown in FIGS. 1 and 2.
Figure 4:
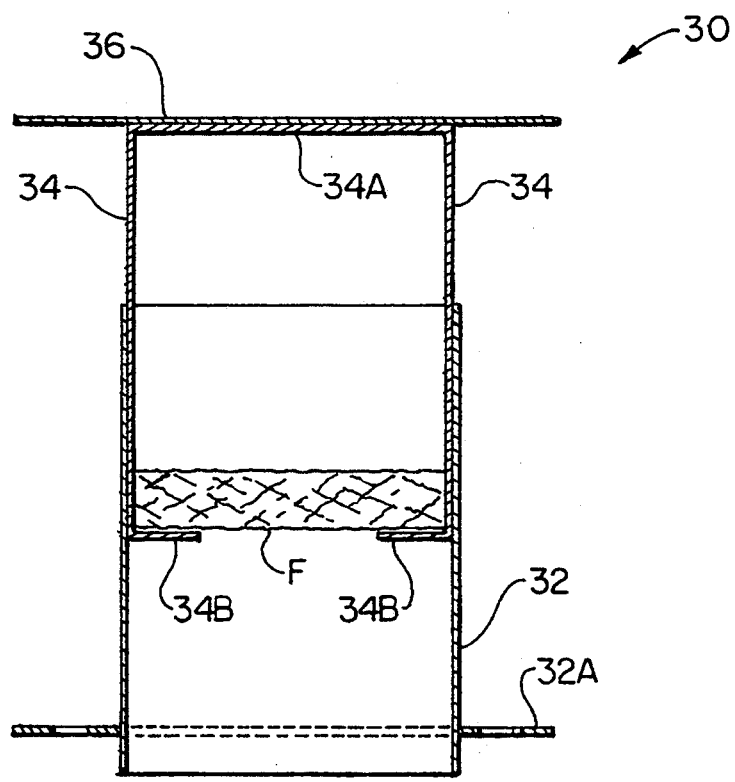
FIG. 4 is a vertical cross-section view of the smoke filter shown in FIG. 3 with the filtration element positioned therein.
Figure 5:
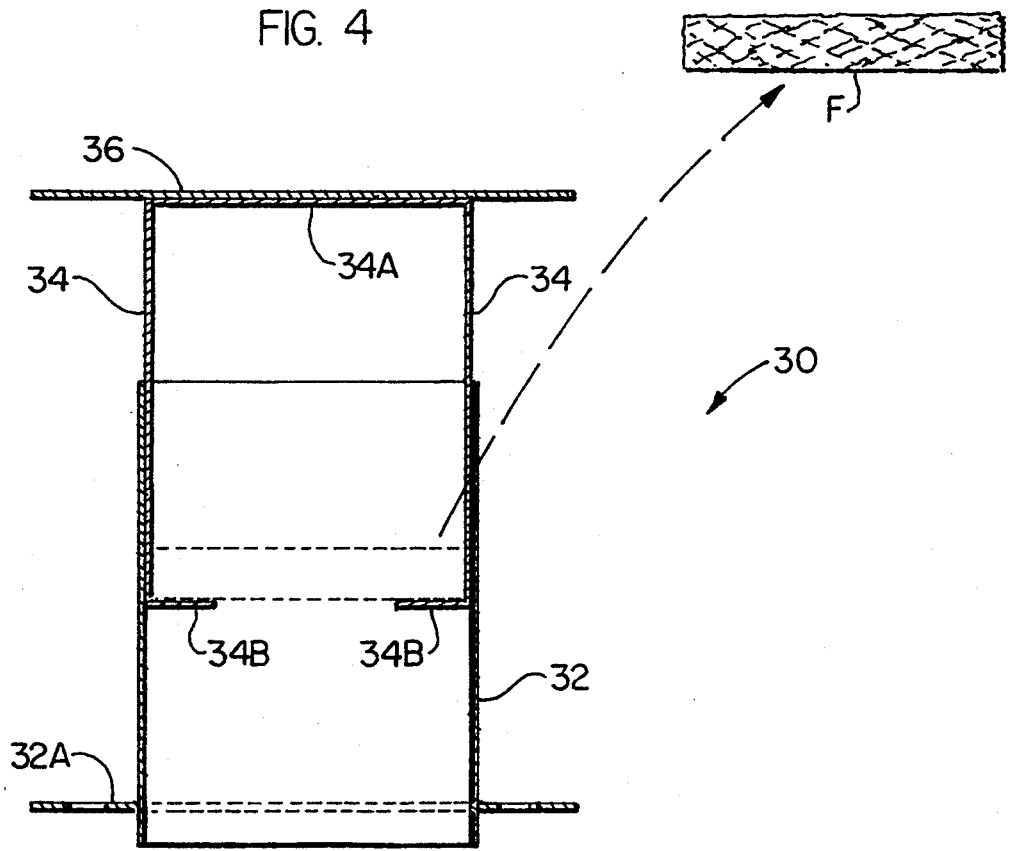
FIG. 5 is a vertical cross-sectional view of the smoke filter shown in FIG. 3 with the filtration element removed therefrom.
Figure 6:
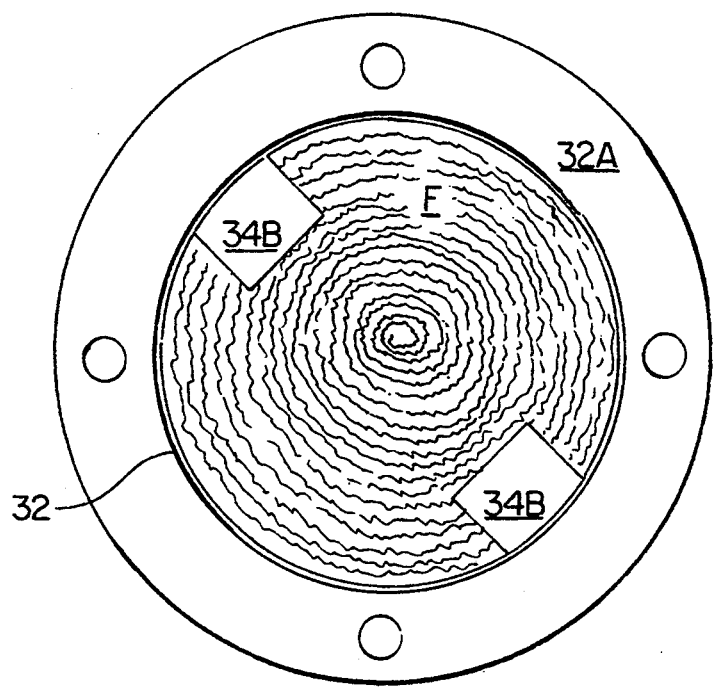
FIG. 6 is a bottom plan view of the smoke filter shown in FIG. 3.

A conventional ventilator mechanism 12A is provided in the bottom of lower housing 12 in order to provide or deny ambient air access, as may be desired, to charcoal briquettes B during the cooking process on portable grill 10. Although ventilator mechanism 12A may be of any suitable conventional construction, FIG. 2 depicts a ventilator mechanism comprising lower housing apertures 12A' which may be opened or closed by selectively rotating plate 12A" (which defines corresponding apertures therein). Ventilator mechanism 12A is conventional and well known to one skilled in the art of barbeque grill construction.

Figure 7:
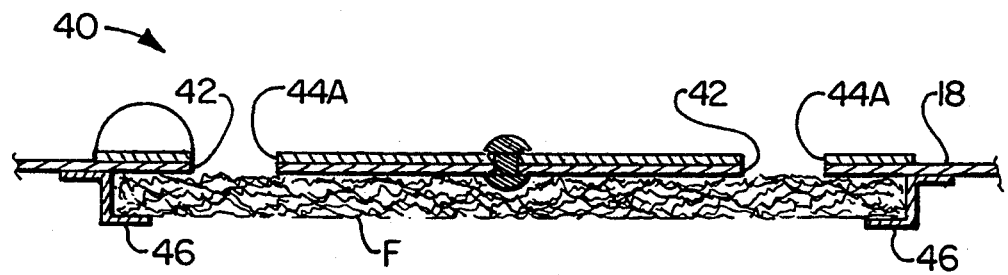
FIG. 7 is a vertical cross-section view of a second embodiment of the barbeque grill with smoke filter of the present invention.

An upper housing or hood 18 is mounted to lower housing 12 by means of hinge 18A. Thus, upper housing 18 may be pivotally raised into an open position in order to place food onto grid 16 and then lowered in order to enclose grill 10 during the cooking process. Although upper housing 18 is shown as pivotally mounted to lower housing 12 by hinge 18A, it should be appreciated that upper housing 18 can be of any suitable construction including being an entirely removable hood-type upper housing. Upper housing 18 similarly to lower housing 12 most preferably is constructed of aluminum. Upper housing 18 further includes handle 20 and, very importantly, smoke exhaust 30. Although smoke exhaust 30 could be formed in many different types of configurations, FIGS. 1 through 6 depict a cylindrical chimney-type smoke exhaust 30. A second type of smoke exhaust is shown in FIG. 7 and will also be discussed in detail hereinbelow.

Referring particularly now to FIGS. 3 through 6, the construction of smoke exhaust 30 can be fully appreciated. Specifically, smoke exhaust 30 is formed from cylindrical housing 32 which defines a flange 32A adjacent the bottom thereof for mounting of smoke exhaust 30 to upper housing 18 by conventional means such as nut and bolt assembly 32B and 32C, respectively. Two upstanding support arms 34 are suitably secured to the inside of housing 32 by welding or the like and connected together at the top by means of crossbar 34A. Top plate 36 is suitably secured by welding or the like to crossbar 34A in order to protect smoke exhaust 30 from rain or the like during use of grill 10.

Still referring to FIGS. 3 through 6, it can be seen that upstanding support arms 34 each have an inwardly extending support tab 34B at the lower end thereof for engaging and retaining filtration element F within housing 32 of the smoke exhaust. Although smoke filtration element F may be formed from substantially any material which would act to filter undesirable smoke contaminants (such as grease particles) from cooking smoke being exhausted through smoke exhaust 30, applicant prefers that filtration element F be a ⅜ inch thick disc formed of expanded aluminum mesh (available in sheet form as Part No. 7515 from Columbus Industries located in Ashville, Ohio). As can be seen particularly with reference to FIGS. 4 and 5, filtration element F may be easily removed from the smoke exhaust 30 for cleaning or replacement at desired intervals in order to maintain the efficacy of filtration element F in cleansing smoke being exhausted from grill 10.

Applicant thus has discovered that smoke exhaust 30 containing filtration element F therein acts to remove undesirable contaminates such as grease particles and the like from cooking smoke. As is becoming better appreciated at this time, smoke from outdoor barbeque grilling grease and other undesirable polluting contaminants which will be introduced into the atmosphere during the outdoor barbeque grilling process. Although this problem has been ignored in the past, it is becoming of greater concern as increasing efforts are being made nationwide to minimize undesirable pollutants from entering the atmosphere. Secondary advantages provided by smoke exhaust 30 having filtration element F provided therein are to contain heat within grill 10 so as to improve fuel efficiency and to reduce the fire hazard from the well known "flaming" phenomenon due to the fact that filtration element F deprives charcoal briquettes B of a sufficient measure of oxygen to obviate (or at least minimize) "flaming" during cooking on grill 10.

An alternative smoke exhaust, generally designated 40, is shown in FIG. 7 and will now be described. Smoke exhaust 40 is generally of the type which can be found, by way of example, on WEBER ® brand outdoor grills of the freestanding kettle type with a removable upper housing hood 18. Smoke exhaust 40 comprises a plurality of apertures 42 in the top portion of upper housing or hood 18 which has a rotatable plate 44 positioned thereover with a plurality of apertures 44A therein which when rotated into registration with apertures 42 serve to open smoke exhaust 40. To close smoke exhaust 40, plate 44 is rotated so as to move apertures 44A out of vertical registration with apertures 42 and to thereby close apertures 42. Filtration element F is removably held in position beneath apertures 42 of upper housing or hood 18 by means of suitable brackets 46 or the like. In this fashion, cooking smoke must pass through filtration element F prior to being exhausted by smoke exhaust 40.

As can be appreciated, although two preferred embodiments of the invention have been disclosed, applicant contemplates that other embodiments of the invention are possible which would incorporate a filtration element in the exhaust system of a portable or stationary outdoor barbeque grill in order to reduce pollutants emanating therefrom into the atmosphere. The portable or stationary outdoor grill may be of substantially any type and still be within the scope of the instant invention, including barbeque grills utilizing conventional charcoal briquettes as the heat source as well as grills utilizing other heating means such as propane gas or electricity. Also, the invention is intended to encompass grills which incorporate the novel exhaust system in the lower housing thereof (either alone or in combination with a similar exhaust system in the upper housing). Thus, the invention is broadly contemplated as providing a filtration element within the exhaust system of any type of portable or stationary outdoor barbeque grill-type cooking apparatus.

It will be understood that various details of the invention may be changed without departing from the scope of the invention. Furthermore, the foregoing description is for the purpose of illustration only, and not for the purpose of limitation—the invention being defined by the claims.

What is claimed is:

1. In a barbeque grill of the type comprising an enclosed housing having an upper and a lower portion, heating means for providing cooking heat located within said lower portion, food supporting means positioned within said lower portion and above said heating means, an upper portion adapted to enclose said lower portion, and a smoke exhaust providing direct fluid communication between the interior of said barbeque grill and the ambient atmosphere and positioned on said enclosed housing for allowing smoke to escape from within said barbeque grill, wherein said smoke exhaust includes a filter for removing contaminants from smoke passing therethrough from the interior of said barbeque grill to the ambient atmosphere.

2. In a barbeque grill according to claim 1 wherein said smoke exhaust comprises an elongated chimney element having one end mounted to said upper portion and in fluid communication with the interior thereof and the other end in fluid communication with the ambient atmosphere.

3. In a barbeque grill according to claim 2 wherein said filter is removably mounted within said chimney element.

4. In a barbeque grill according to claim 2 wherein said filter comprises an aluminum mesh disc.

5. In a barbeque grill according to claim 1 wherein said filter comprises an aluminum mesh disc.

6. In a barbeque grill of the type comprising an enclosed housing having an upper and a lower portion, heating means for providing cooking heat located within said lower portion, food support means positioned within said lower portion and above said heating means, an upper portion adapted to enclose said lower portion and a smoke exhaust positioned on said enclosed housing for allowing smoke to escape from within said barbeque grill, wherein said smoke exhaust includes a filter for removing contaminants from smoke passing therethrough, and wherein said smoke exhaust comprises at least one aperture within said upper portion and closure means for selectively opening and closing said aperture.

7. In a barbeque grill according to claim 6 wherein said filter is removably mounted adjacent said aperture and in the pathway of smoke passing through said aperture.

8. In a barbeque grill according to claim 7 wherein said filter comprises an aluminum mesh disc.

9. In a barbeque grill according to claim 6 wherein said filter comprises an aluminum mesh disc.

10. In a portable barbeque grill of the type comprising an enclosed housing having an upper and a lower portion, heating means for providing cooking heat located within said lower portion, food supporting means positioned within said lower portion and above said heating means, an upper portion adapted to enclose said lower portion, and a smoke exhaust providing direct fluid communication between the interior of said barbeque grill and the ambient atmosphere and positioned on said enclosed housing for allowing smoke to escape from within said barbeque grill, wherein said smoke exhaust comprises an elongated chimney element having one end mounted to said upper portion and in fluid communication with the interior thereof and the other end in fluid communication with the ambient atmosphere, and a filter positioned within said chimney element for removing contaminants from smoke passing therethrough from the interior of said barbeque grill to the ambient atmosphere.

11. In a barbeque grill according to claim 10 wherein said filter is removably mounted within said chimney element.

12. In a barbeque grill according to claim 11 wherein said filter comprises an aluminum mesh disc.

13. In a barbeque grill according to claim 10 wherein said filter comprises an aluminum mesh disc.

14. In a portable barbeque grill of the type comprising an enclosed housing having an upper and a lower portion, heating means for providing cooking heat located within said lower housing, food supporting means positioned within said lower portion and above said heating means, an upper portion adapted to enclose said lower portion, and a smoke exhaust positioned on said enclosed housing for allowing smoke to escape from within said barbeque grill, wherein said smoke exhaust comprises at least one aperture within said upper portion, closure means for selectively opening and closing said aperture, and a filter mounted adjacent said aperture and in the pathway of smoke passing through said aperture for removing contaminants therefrom.

15. In a barbeque grill according to claim 14 wherein said filter is removably mounted and adjacent said aperture.

16. In a barbeque grill according to claim 15 wherein said filter comprises an aluminum mesh disc.

17. In a barbeque grill according to claim 14 wherein said filter comprises an aluminum mesh disc.

* * * * *